(12) United States Patent
Kowalchuk et al.

(10) Patent No.: US 10,912,243 B2
(45) Date of Patent: Feb. 9, 2021

(54) DEPTH ADJUSTMENT SYSTEM FOR SEED PLANTING UNITS OF AN AGRICULTURAL IMPLEMENT AND RELATED ASSEMBLIES

(71) Applicant: CNH Industrial Canada, Ltd., Saskatoon (CA)

(72) Inventors: Trevor L. Kowalchuk, Saskatoon (CA); Russell Altman, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 195 days.

(21) Appl. No.: 16/031,276

(22) Filed: Jul. 10, 2018

(65) Prior Publication Data
US 2020/0015405 A1 Jan. 16, 2020

(51) Int. Cl.
| | | |
|---|---|---|
| *A01B 63/00* | (2006.01) | |
| *A01C 5/06* | (2006.01) | |
| *A01B 63/22* | (2006.01) | |
| *F16H 1/22* | (2006.01) | |
| *F16H 19/04* | (2006.01) | |

(Continued)

(52) U.S. Cl.
CPC ............ *A01B 63/008* (2013.01); *A01B 63/22* (2013.01); *A01C 5/062* (2013.01); *A01C 5/068* (2013.01); *F16H 1/22* (2013.01); *F16H 7/06* (2013.01); *F16H 19/04* (2013.01); *F16H 25/16* (2013.01)

(58) Field of Classification Search
CPC ..... A01B 63/008; A01B 63/002; A01B 63/00; A01B 63/22; A01B 63/16; A01B 63/14; A01C 5/062; A01C 5/06; A01C 5/00; A01C 5/068; A01C 5/066; F16H 1/22; F16H 1/20; F16H 1/02; F16H 1/00; F16H 7/06; F16H 7/00; F16H 19/04; F16H 19/00; F16H 25/16; F16H 25/00
See application file for complete search history.

(56) References Cited

U.S. PATENT DOCUMENTS

| | | |
|---|---|---|
| 3,622,042 A | 11/1971 | Fischer |
| 4,126,187 A | 11/1978 | Schreiner et al. |

(Continued)

FOREIGN PATENT DOCUMENTS

| | | | |
|---|---|---|---|
| AU | 2016/222509 A1 | 3/2017 | |
| GB | 1359435 A * | 7/1974 | ........... B21B 21/005 |

(Continued)

OTHER PUBLICATIONS

Sivakumar, Development of a Tractor Mounted Automatic Vegetable Transplanter, Tamil Nadu Agricultural University, Coimbatore, 2014, 231 pages. krishikosh.egranth.ac.in/bitstream/1/5810011571/1/D-622.pdf.

(Continued)

*Primary Examiner* — Christopher J. Novosad
(74) *Attorney, Agent, or Firm* — Rebecca L. Henkel; Rickard K. DeMille

(57) ABSTRACT

A system for adjusting penetration depth settings of seed planting units of an agricultural implement, the system may include a plurality of seed planting units and a common drive assembly. Each of the seed planting units may have a depth adjustment assembly. The common drive assembly may be configured to drive the depth adjustment assemblies of the plurality of seed planting units so as to simultaneously adjust a penetration depth setting of each respective seed planting unit.

10 Claims, 9 Drawing Sheets

(51) Int. Cl.
*F16H 7/06* (2006.01)
*F16H 25/16* (2006.01)

(56) References Cited

U.S. PATENT DOCUMENTS

| | | |
|---|---|---|
| 4,137,853 A | 2/1979 | Peterson |
| 5,595,130 A | 1/1997 | Baugher et al. |
| 7,481,278 B1 | 1/2009 | Pomedli et al. |
| 8,127,861 B2 | 3/2012 | Meek |
| 8,635,962 B2 | 1/2014 | Schilling |
| 9,573,507 B2 | 2/2017 | Wolowski |
| 2017/0079193 A1 | 3/2017 | Sheppard |

FOREIGN PATENT DOCUMENTS

| | | |
|---|---|---|
| WO | WO2007/064184 A2 | 6/2007 |
| WO | WO2013/053645 A1 | 4/2013 |

OTHER PUBLICATIONS

AGCO Corporation, Sunflower, 9800 Features, 2018. (Webpage Only). http://www.sunflowermfg.com/products/index.php?id=49&sID=60&pID=109.

Farm Machinery and Equipment, eCourses Online, 2014, 6 pages. http://ecourseonline.iasri.res.in/mod/page/view.php?id=494.

\* cited by examiner

DEPTH ADJUSTMENT SYSTEM FOR SEED PLANTING UNITS OF AN AGRICULTURAL IMPLEMENT AND RELATED ASSEMBLIES

FIELD OF THE INVENTION

The present subject matter relates generally to agricultural implements, and more specifically, to a system for adjusting the penetration depth settings of seed planting units of an agricultural implement, as well as a related depth adjustment assembly provided in operative association with each seed planting unit.

BACKGROUND OF THE INVENTION

Generally, agricultural seed planting units are towed behind a tractor or other work vehicle via a mounting bracket secured to a rigid frame of an agricultural implement, such as a planter or seeder. These seed planting units typically include a ground engaging tool or opener that forms a furrow or seed planting trench for seed deposition into the soil. Specifically, the opener is used to break the soil to enable seed deposition. After the seed is deposited, the opener is followed by a packer wheel that packs the soil on top of the deposited seed. The packer wheel also serves to adjust the penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel, thereby, in turn, adjusting the penetration depth of the opener. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain agricultural implements have multiple seed planting units, and therefore have multiple openers (e.g., greater than 50, 60, 70, 80, 90, or more). Because the openers are typically configured to maintain the same penetration depth setting, the duration of the depth adjustment process is multiplied by the number of openers coupled to the implement. Consequently, reconfiguration of the implement for a different penetration depth setting may result in large delays in seeding operations, thereby decreasing seeding efficiency.

Accordingly, an improved system for use within an agricultural implement that allows more efficient reconfiguration of the depth settings of the implement's openers would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a system for adjusting penetration depth settings of seed planting units of an agricultural implement. The system may generally include a plurality of seed planting units and a common drive assembly. Each of the seed planting units generally includes a depth adjustment assembly, wherein the common drive assembly may be configured to drive the depth adjustment assemblies of the seed planting units to simultaneously adjust a penetration depth setting of each respective seed planting unit.

In another embodiment, the present subject matter is directed to an agricultural implement including a frame and a plurality of seed planting units supported by the frame, wherein the seed planting units may be configured to deposit seeds within a field as the implement is moved across the field. Each seed planting unit may generally include a support structure, a ground engaging tool supported by the support structure and configured to penetrate a soil surface, a wheel support arm having an upper portion and a lower portion and configured to be pivotally coupled to the support member and a wheel. The wheel may be rotatably supported by the lower portion of the wheel support arm and be configured to contact the soil surface to define a penetration depth setting for the ground engaging tool relative to the soil surface. Each seed planting unit may further include a depth adjustment assembly configured to be rotated adjust a vertical position of the wheel relative to the ground engaging tool. Additionally, the agricultural implement may include a common drive assembly. The common drive assembly may be configured to rotationally drive the depth adjustment assembly of each of the seed planting units to simultaneously adjust the penetration depth setting of each respective seed planting unit.

In a further embodiment, the present subject matter is directed to a seed planting unit of an agricultural implement, with the seed planting unit generally including a support structure, a ground engaging tool supported by the support structure and configured to penetrate a soil surface, a wheel support arm, and a wheel. The wheel may be configured to be rotatably supported by the wheel support arm and to contact the soil surface to define a penetration depth setting for the ground engaging tool relative to the soil surface. The seed planting unit may further include a depth adjustment assembly having a cam member and a depth adjustment gear rotatably coupled to the cam member. The cam member may be configured to be rotated to adjust a vertical position of the wheel relative to the ground engaging tool. The seed planting unit may further include an actuating member configured to rotationally drive the depth adjustment gear. Additionally, the depth adjustment gear and the actuating member may include interlocking engagement elements, such that when the actuating member is rotated, the cam member is rotated relative to the support structure to vary the penetration depth setting for the ground engaging tool.

In another embodiment, the present subject matter is directed to a seed planting unit for an agricultural implement, with the seed planting unit generally including a support structure, a ground engaging tool supported by the support structure and configured to penetrate a soil surface, a wheel support arm having an upper portion and a lower portion and configured to be pivotally coupled to the support member about a pivot point between the upper and lower portions, and a wheel. The wheel may be rotatably supported by the lower portion of the wheel support arm and may be configured to contact the soil surface to define a penetration depth setting for the ground engaging tool relative to the soil surface. The seed planting unit may further include a depth adjustment assembly including a cam member and a depth adjustment gear rotatably coupled to the cam member. The cam member may be configured to be rotated to adjust a vertical position of the wheel relative to the ground engaging tool. Additionally, the upper portion of the wheel support arm may be configured to abut against the cam member to set the penetration depth setting for the ground engaging tool.

In yet another embodiment, the present subject matter is directed to an agricultural implement including a frame, a plurality of seed planting units supported by the frame, with the seed planting units being configured to deposit seeds within a field as the implement is moved across the field. Each seed planting unit may generally include a support structure, a ground engaging tool supported by the support structure and configured to penetrate a soil surface, a wheel support arm having an upper portion and a lower portion and configured to be pivotally coupled to the support member about a pivot point between the upper and lower portions, and a wheel. The wheel may be rotatably supported by the lower portion of the wheel support arm and may contact the soil surface to define a penetration depth setting for the ground engaging tool relative to the soil surface. Each seed planting unit may further include a depth adjustment assembly having a cam member and a depth adjustment gear rotatably coupled to the cam member. The cam member of each seed planting unit may be configured to be rotated to adjust a vertical position of the wheel relative to the ground engaging tool. Each seed planting unit may additionally include an actuating member configured to rotationally drive the depth adjustment gear, wherein, when the actuating member is rotated, the cam member is rotated relative to the support structure to vary the penetration depth setting for the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
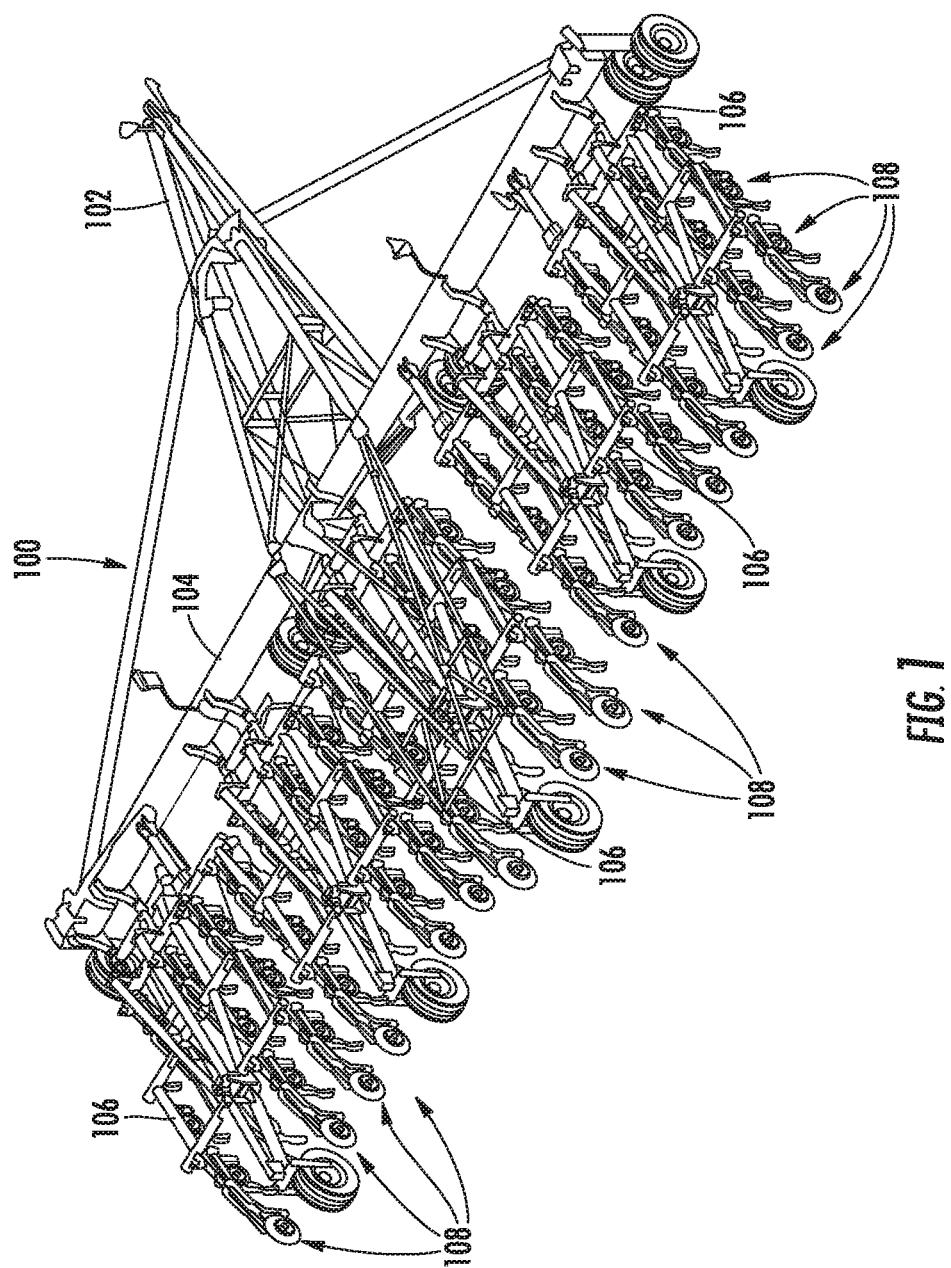
FIG. 1 illustrates a perspective view of one embodiment of an agricultural implement including multiple seed planting units in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for adjusting the penetration depth settings of a plurality of seed planting units of an agricultural implement. In addition, the present subject matter is also directed to a depth adjustment assembly configured to be provided in operative association with a given seed planting unit to allow its respective penetration depth setting to be adjusted.

In several embodiments, the agricultural implement may correspond to a planter or seeder and may include a plurality of seed planting units coupled to or otherwise supported by a frame of the planter/seeder. In one embodiment, each seed planting unit may include a ground engaging tool configured to open the soil surface to create a seed trench or furrow, and a wheel rotatably supported by a corresponding wheel support arm of the seed planting unit, with the wheel being configured to roll across or otherwise contact the soil surface to set a penetration depth of the ground engaging tool, as well as to close the seed trench upon deposition of seed therein. Additionally, in accordance with aspects of the present subject matter, each seed planting unit may be configured to allow a penetration depth setting for the ground engaging tool to be selectively adjusted. Specifically, the seed planting unit may include a depth adjustment assembly configured to allow the vertical position of the wheel to be adjusted relative to the ground engaging tool, which, in turn, may result in a corresponding adjustment in the penetration depth setting. As such, the depth adjustment assembly may be used to set the desired penetration depth for the ground engaging tool based on, e.g., the soil composition or seed type, to allow for more efficient and/or effective seeding operations.

In several embodiments, the depth adjustment assembly may be selectively movable relative to the support structure to adjust the penetration depth for the ground engaging tool. Specifically, in one embodiment, the depth adjustment assembly may include a cam member. As will be described below, the cam member may include a cam surface defining a cam profile, with a portion of the wheel support arm configured to be supported by or otherwise contact the cam surface when the support structure is in a working position to set a penetration depth setting of the associated ground engaging tool. In such an embodiment, the cam member may be configured to be rotatable relative to the support structure to vary the portion of the cam surface being contacted by the wheel support arm, thereby adjusting the vertical position of the wheel relative to the ground engaging tool and, thus, adjusting the associated penetration depth setting of the ground engaging tool.

Moreover, in several embodiments, to allow the cam member to be rotated relative to both the support structure and the wheel support arm, the depth adjustment assembly may also include an associated depth adjustment gear coupled to the cam member such that rotation of the gear results in corresponding rotation of the cam member. In such embodiments, the depth adjustment gear may be configured to be engaged with a rotational drive source, such as an actuating member, configured to rotationally drive the gear. For instance, the depth adjustment gear and the associated actuating member may include mating or corresponding engagement elements, with the engagement elements of the gear being configured to engage or otherwise interlock with the engagement elements of the actuating member. In such an embodiment, the depth adjustment gear and, thus, the cam member of the depth adjustment assembly may be configured to be rotated relative to the support structure with rotation of the actuating member (e.g., to adjust the penetration depth setting of the associated ground engaging tool).

It should be appreciated that, in accordance with aspects of the present subject matter, the rotational position of each depth adjustment assembly of the agricultural implement may be configured to be adjusted either manually or automatically to adjust the penetration depth setting for the ground engaging tools. For instance, in one embodiment, an operator may be allowed to manually adjust the position of each depth adjustment assembly (e.g., by rotating the associated actuating member). Alternatively, the various depth adjustment assemblies of the seed planting units may be incorporated within an automatically controlled depth adjustment system for simultaneously adjusting the penetration depth settings of two or more of the seed planting units.

For example, in several embodiments, the disclosed system may include a common drive assembly coupled to two or more of the depth adjustment assemblies of the various seed planting units of the agricultural implement. In such embodiments, the common drive assembly may be configured to function as a common rotational drive source for rotationally driving the depth adjustment assemblies coupled thereto, thereby allowing the penetration depth settings of the associated seed planting units to be automatically and simultaneously adjusted. For instance, in one embodiment, the common drive assembly may include a rotational drive unit rotationally coupled to a plurality of depth adjustment assemblies of the seed planting units via torque transmitting members (e.g., flexible torque cables) to transmit torque from the rotational drive unit to the depth adjustment assemblies for adjusting the penetration depth setting(s) of the associated ground engaging tool(s).

Referring now to the drawings, FIG. 1 illustrates a perspective view of one embodiment of an agricultural implement 100. In general, the implement 100 is configured to be towed behind a work vehicle, such as a tractor (not shown). As shown in FIG. 1, the implement 100 may include a tow bar assembly 102, which is shown in the form of an A-frame hitch assembly. The tow bar assembly 102 may include a hitch configured to attach to an appropriate tractor hitch via a ball, clevis, or other coupling. Additionally, the tow bar assembly 102 may be coupled to a tool bar 104, which, in turn, supports multiple tool frames 106. Moreover, in several embodiments, each tool frame 106 may include multiple seed planting units 108, such as a plurality of hoe openers, coupled thereto or supported thereby. As discussed in detail below, each seed planting unit 108 may be configured to facilitate quick and efficient reconfiguration of the unit 108 for varying penetration depth settings in accordance with aspects of the present subject matter.

It should be appreciated that the configuration of the implement 100 described above and shown in FIG. 1 is provided only to place the present subject matter in an exemplary field of use. Thus, it should be appreciated that the present subject matter may be readily adaptable to any manner of implement configuration.

Figure 2:
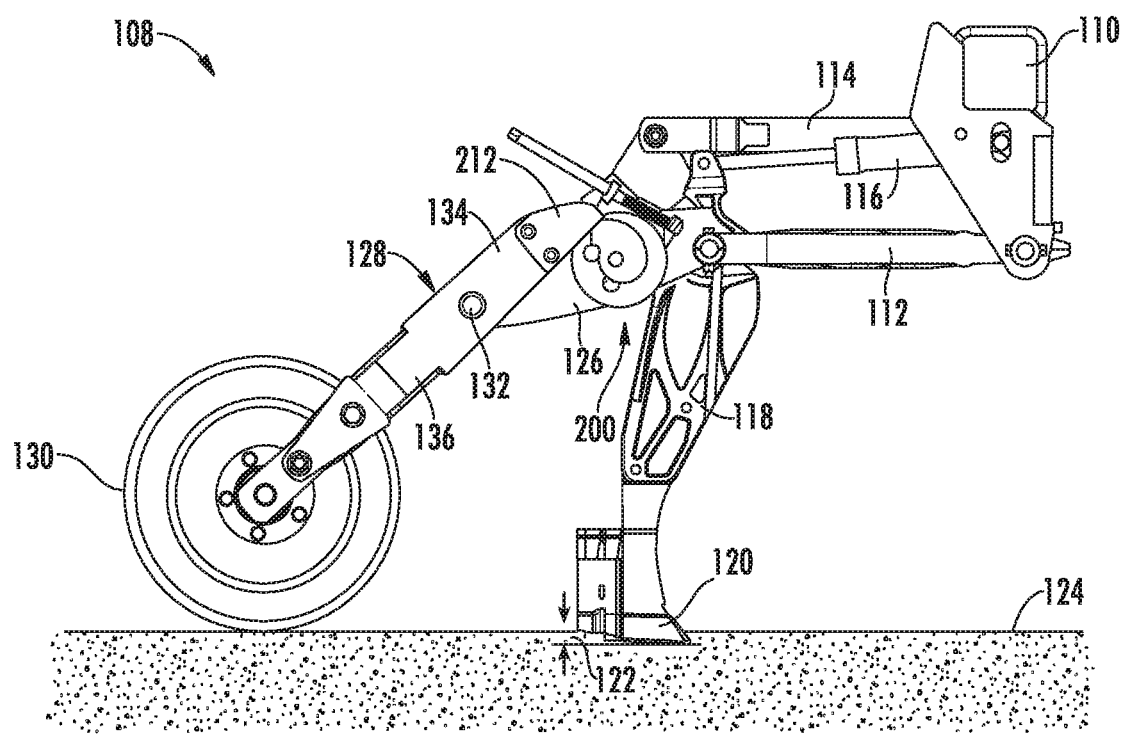
FIG. 2 illustrates a side view of one embodiment of a seed planting unit suitable for use within the agricultural implement shown in FIG. 1 in accordance with aspects of the present subject matter, particularly illustrating the seed planting unit including a depth adjustment assembly for adjusting the penetration depth setting of a ground engaging tool of the unit.

Referring now to FIG. 2, a side view of one embodiment of a seed planting unit 108 suitable for use within an agricultural implement (e.g., the implement 100 shown in FIG. 1) is illustrated in accordance with aspects of the present subject matter, particularly illustrating the unit 108 including one embodiment of a depth adjustment assembly having components or features configured to facilitate reconfiguration of the unit's penetration depth setting. It should be appreciated that, although the seed planting unit 108 is shown and described herein as corresponding to a hoe opener, the seed planting unit 108 may generally correspond to any suitable row unit having any suitable configuration that facilitates the deposition of seeds within the soil.

Additionally, it should be appreciated that, although the seed planting unit 108 will generally be described in the context of the implement 100 shown in FIG. 1, the unit 108 may generally be configured to be installed on any suitable implement having any suitable implement configuration.

As shown in FIG. 2, the seed planting unit 108 includes a mounting bracket 110, a first linkage member 112, a second linkage member 114, and a biasing device or actuator, such as a cylinder 116 (e.g., hydraulic and/or pneumatic piston-cylinder assembly). In one embodiment, the cylinder 116 may be hydraulically coupled to a power supply that provides a flow of pressurized hydraulic fluid which displaces a piston rod extending from the cylinder. The mounting bracket 110 and associated hardware are generally configured to interface with the tool frame 106 (FIG. 1), thereby securing the seeding planting unit 108 to the implement 100 (FIG. 1). For instance, multiple seed planting units 108 may be mounted in parallel along the tool frame 106 (FIG. 1) to form a seeding assembly or unit. In the illustrated embodiment, the first linkage member 112, the second linkage member 114, and the mounting bracket 110 generally form elements of a parallel linkage, also known as a four bar linkage. As will be appreciated, components of the seed planting unit 108, such as the mounting bracket 110 (and associated hardware), first linkage member 112, and second linkage member 114, may be made of any suitable material, such as steel. It should be appreciated that, in other embodiments, any other suitable linkage(s) or linkage assembly may be used to couple the seed planting unit 108 to the tool frame 106. For example, in an alternative embodiment, only one of the linkage members 112, 114 may be used to couple the seed planting unit 108 to the frame 106, such as configuring a single linkage for use in a trailing arm opener design.

As is illustrated in FIG. 2, the cylinder 116 may be attached to a shank 118 either directly, e.g., via a pin at the end of the piston rod, or indirectly, e.g., via a swing link or other linkage coupled between the shank 118 and the cylinder 116. A ground engaging tool, such as the illustrated opener 120, is also attached to the shank 118 and is configured to engage the soil. Contact force between the opener 120 and the soil establishes a moment about a shank pivot joint. This moment is resisted by the force applied to the shank 118 by the cylinder 116. Furthermore, the linkage is configured to facilitate vertical movement of the implement 100, while maintaining the opener 120 at a desired penetration depth setting 122 within soil 124. The desired penetration depth setting 122 may be selected based on soil conditions, or environmental factors, among other considerations. As illustrated, the linkage is coupled to a wheel support structure, such as the illustrated support structure 126.

A wheel support arm 128, including a packer wheel 130, is pivotally coupled to the support structure 126 by a pin 132 disposed through openings within the wheel support arm 128 and the support structure 126. The pin 132 is generally positioned at an interface between an upper portion 134 and a lower portion 136 of the wheel support arm 128. The packer wheel 130 is rotatably coupled to the lower portion 136 of the wheel support arm 128 and is configured to roll along or otherwise contact the soil surface to both pack the soil on top of deposited seeds and limit the penetration depth setting 122 of the opener 120. The pin 132 enables rotation of the wheel support arm 128 about a pivot point defined by the pin 132 with respect to the support structure 126. However, in a working mode, rotation of the wheel support arm 128 relative to the support structure 126 is blocked by a depth adjustment assembly 200 of the seed planting unit 108.

As discussed in detail below, the depth adjustment assembly 200 is configured to be rotated relative to the support structure 126 when it is desired to adjust the penetration depth setting 122 of the opener 120. Specifically, the depth adjustment assembly 200 may be configured to include a cam member defining a cam profile along which a portion of the wheel support arm 128 contacts or otherwise follows with rotation of the depth adjustment assembly 200. As such, movement of the depth adjustment member 200, and its associated cam profile, relative to the support structure 126 may result in the portion of the wheel support arm 128 contacting the cam member being raised or lowered relative to the rotational axis of the cam member, which, in turn, varies the vertical positioning of the opener 120 relative to the packer wheel 130, thereby altering the penetration depth setting 122 of the opener 120. As previously discussed, the packer wheel 130 rotates across the surface of the soil 124 to limit the penetration depth setting 122 of the opener 120. Consequently, the difference in vertical position between the packer wheel 130 and the opener 120 defines the penetration depth setting 122 of the opener 120 within the soil 124.

Figure 3:
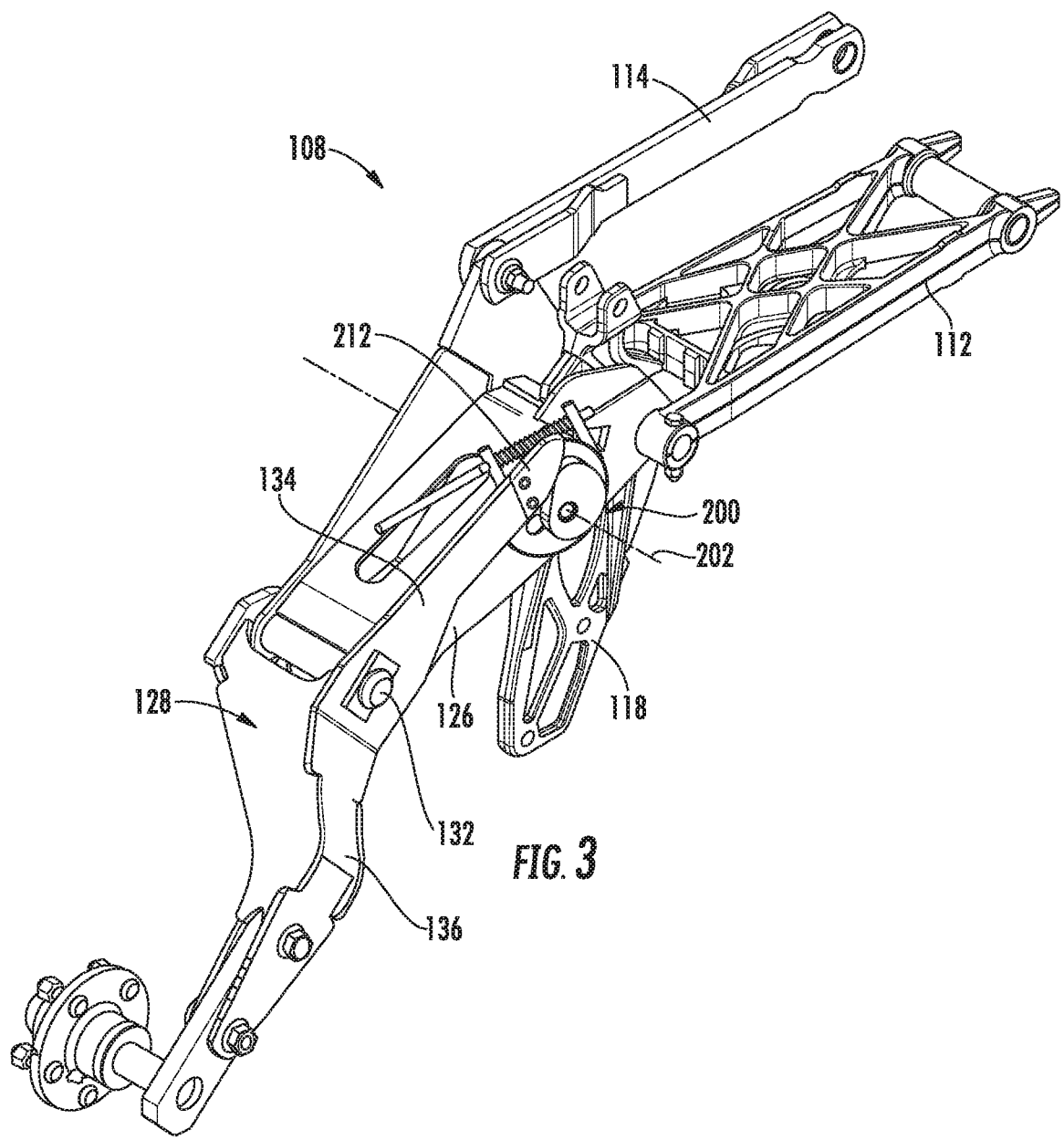
FIG. 3 illustrates a partial, perspective view of the seed planting unit shown in FIG. 2 with various components of the unit, including a packer wheel and a portion of the ground engaging tool, removed for purposes of illustration, particularly illustrating aspects of a support structure, a support arm, and the depth adjustment assembly of the seed planting unit in accordance with aspects of the present subject matter.
Figure 4:
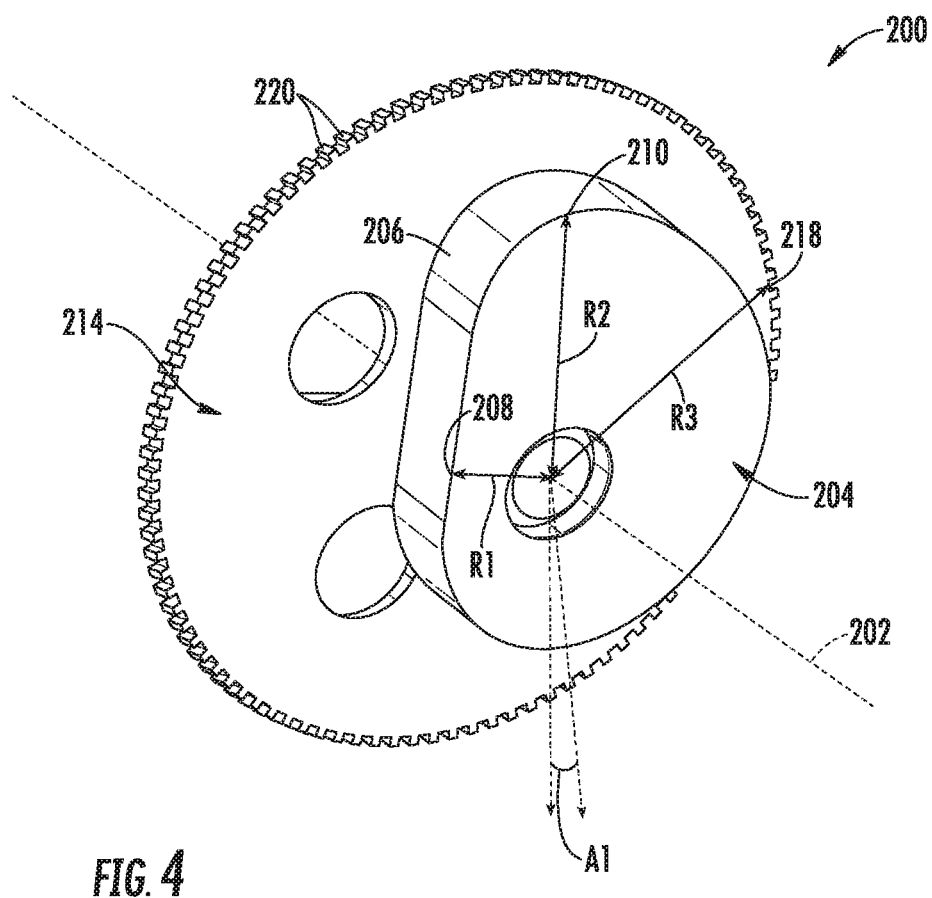
FIG. 4 illustrates a perspective view of portions of the depth adjustment assembly shown in FIG. 3 in accordance with aspects of the present subject matter, particularly illustrating a cam member and an associated depth adjustment gear of the depth adjustment assembly.
Figure 5:
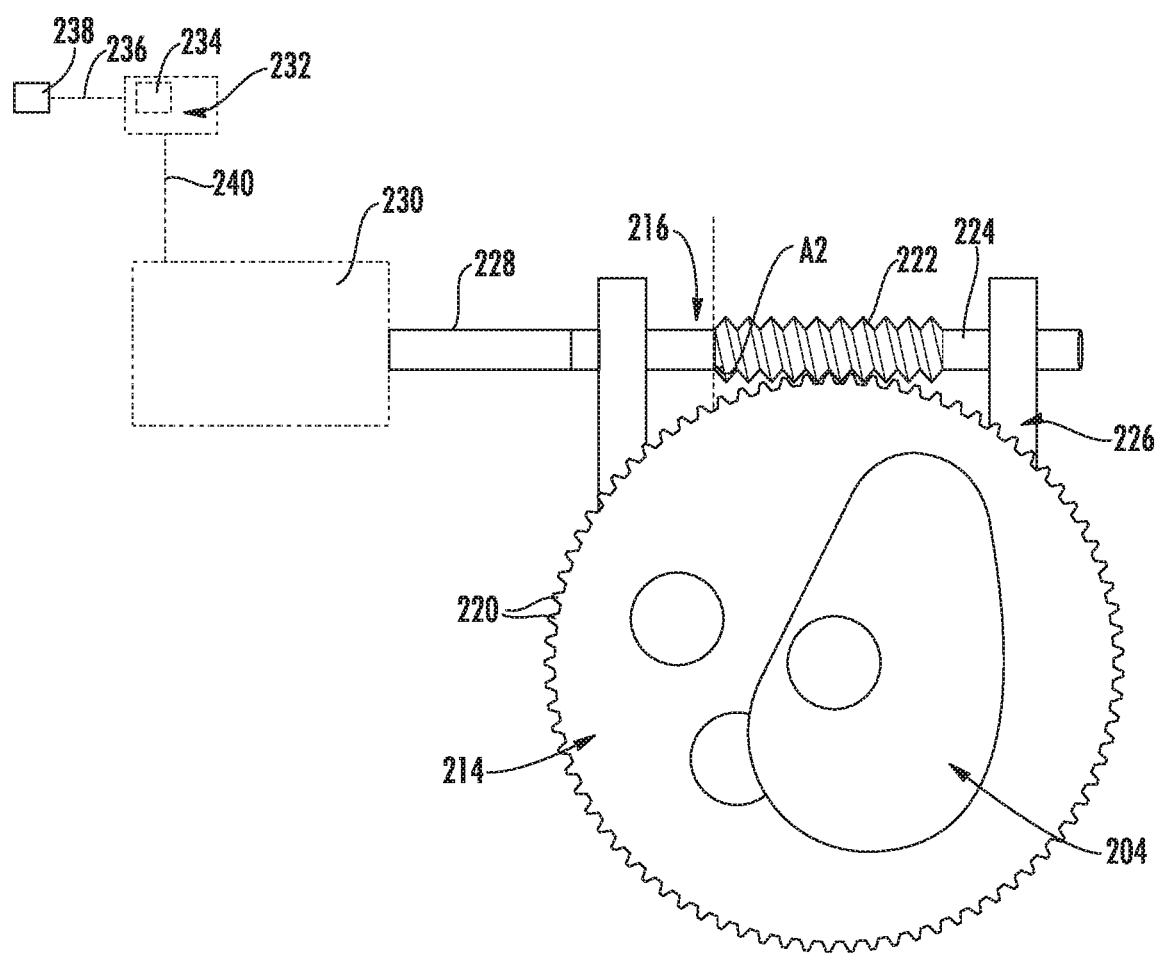
FIG. 5 illustrates a partial, perspective view of the depth adjustment assembly shown in FIG. 3 in accordance with aspects of the present subject matter, particularly illustrating an actuating member configured to engage the depth adjustment gear of the depth adjustment assembly for rotationally driving the assembly.

Referring now to FIGS. 3-5, various views of one embodiment of a depth adjustment assembly 200 configured for use with a seed planting unit (e.g. the unit 108 shown in FIG. 2) are illustrated in accordance with aspects of the present subject matter. Specifically, FIG. 3 illustrates a partial, perspective view of the seed planting unit 108 described above with reference to FIG. 2 having the illustrated depth adjustment assembly 200 installed relative thereto, particularly depicting various components of the unit 108 (e.g., the opener 122 and the packer wheel 132) removed from the drawing for purposes of illustration. FIG. 4 illustrates a perspective view of the depth adjustment assembly 200 shown in FIGS. 2 and 3. Additionally, FIG. 5 illustrates a partial, perspective view of features for rotationally driving the depth adjustment assembly 200 relative to the support structure 126 and/or the adjacent wheel support arm 128.

As shown in FIG. 3, in several embodiments, the depth adjustment assembly 200 may be configured to be installed relative to or otherwise supported by the support structure 126 of the seed planting unit 108 such that it is selectively rotatable relative to the support structure 126 about a central rotational axis 202. As indicated above, rotation of the depth adjustment assembly 200 relative to the support structure 126 may result in the portion of the wheel support arm 128 (FIG. 3) contacting the depth adjustment assembly 200 being raised or lowered relative to the rotational axis 202 of the depth adjustment member 200, which, in turn, varies the vertical positioning of the opener 120 (FIG. 2) relative to the packer wheel 130 (FIG. 2) and, thus, adjusts the penetration depth setting 122 of the opener 120, as desired or necessary.

As shown in FIG. 4, in several embodiments, the depth adjustment assembly 200 includes a cam member 204 having a cam surface 206 defining a cam profile. In the embodiment shown in FIG. 4, the cam profile is a non-circular cam profile, such as by configuring the cam member 204 to have a lob cam design. However, in other embodiments, the cam member 204 may define any other suitable cam profile that allows the cam member 204 to function as described herein. For example, in one embodiment, the cam profile of the cam member 204 may be a circular profile (not shown). In such an embodiment, a geometric center of the cam member 204 may be offset from the rotational axis 202 of the depth adjustment member 200.

In several embodiments, the cam surface 206 may be an outer cam surface, spaced apart radially from the rotational axis 202 of the depth adjustment member 200 such that a radial distance defined between the cam surface 206 and the rotational axis 202 varies around the perimeter of the cam profile. For example, as shown in FIG. 4, the cam surface 206 may be spaced apart from the rotational axis 202 at a first end 208 of the cam profile by a first radial distance R1 and may be spaced apart from the rotational axis 202 at an opposed second end 210 of the cam profile by a second radial distance R2, with the second radial distance R2 being greater than the first radial distance R1. In such an embodiment, the radial spacing defined between the cam surface 206 and the rotational axis 202 may generally increase as the cam surface 206 extends between the first and second ends 208, 210 of the cam profile.

As indicated above with reference to FIG. 2, a portion of the wheel support arm 128 may be configured to contact or otherwise follow the cam surface 206 as the depth adjustment assembly 200 is rotated relative to the support structure 126. For example, as shown in FIG. 3, the wheel support arm 128 may include an abutment portion 212 positioned at an end of the upper portion 134 of the wheel support arm 128, opposite the pin 132. In such an embodiment, the abutment portion 212 of the wheel support arm 128 may be configured to be supported on top of the cam surface 206 such that the vertical positioning of the abutment portion 212 (and, thus, the relative vertical positioning of the packer wheel 130) varies with rotation of the depth adjustment assembly 200.

For example, as the depth adjustment assembly 200 is rotated relative to the support structure 126 in one direction such that radial spacing defined between the rotational axis 202 of the depth adjustment assembly 200 and the portion of the cam surface 206 on which the abutment portion 212 is supported decreases, the abutment portion 212 may pivot downwardly, closer to the rotational axis 202, about the pivot point defined by pin 132, thereby causing the opposed end of the wheel support arm 128 to pivot upwardly, which, in turn, raises the packer wheel 130 relative to the opener 120 and, thus, increases the penetration depth setting 122 for the opener 120. Similarly, as the depth adjustment assembly is rotated relative to the support structure 126 in the opposite direction such that radial spacing defined between the rotational axis 202 of the depth adjustment assembly 200 and the portion of the cam surface 206 on which the abutment portion 212 is supported increases, the abutment portion 212 may pivot upwardly, further from the rotational axis 202, about the pivot point defined by pin 132, thereby causing the opposed end of the wheel support arm 128 to pivot downwardly, which, in turn, lowers the packer wheel 130 relative to the opener 120 and, thus, decreases the penetration depth setting 122 for the opener 120. Accordingly, by rotating the depth adjustment assembly 200 (and, more specifically, the cam member 204) relative to the support structure 126, the abutment portion 212 may be move further from or closer to the rotational axis 202 of the depth adjustment assembly 200, thus, pivoting the wheel support arm 128 about the pin 132 to adjust the vertical positioning of the packer wheel 130 relative to the opener 120 in a manner that varies the associated penetration depth setting 122.

To allow the rotational position of the depth adjustment assembly 200 and associated cam surface 206 to be adjusted relative to the support structure 126 and to the abutment portion 212 of the wheel support arm 128, the depth adjustment assembly 200 may also include a depth adjustment gear 214 rotationally fixed or otherwise coupled to the cam member 204. As such, as the gear 214 is rotationally driven above the rotational axis 204 of the depth adjustment assembly 200, the cam member 204 may similarly rotate to adjust the positioning of the cam surface 206 relative to the abutment portion 212 of the wheel support member 128 so as to vary the associated penetration depth setting. In the illustrated embodiment, the cam member 204 and associated gear 214 correspond to separate components configured to be coupled to each other. However, in other embodiments, it should be appreciated that the cam member 204 and depth adjustment gear 214 may be formed integrally as a single unitary component. As shown in the illustrated embodiment, the gear 214 may include an outer perimeter 218 radially spaced apart from the rotational axis 202 of the depth adjustment member by a third radial distance R3, with the third radial distance R3 being larger than the second radial distance R2 defined at the second end 210 of the outer cam profile of the cam member 204. As such, the depth adjustment gear 214 may extend or project radially outwardly relative to the outer surface 206 of the cam member 204.

In several embodiments, the depth adjustment gear 214 may be configured to be coupled to a suitable rotational drive source, thereby allowing the depth adjustment assembly to be rotationally driven. Specifically, in the embodiment shown in FIG. 5, the depth adjustment gear is provided in interlocking engagement with an actuating member 216 configured to serve as the rotational drive source of the depth adjustment assembly 200. In such an embodiment, the actuating member 216 and the gear 214 may be configured to include interlocking engagements elements for transmitting torque between such components. For example, in the illustrated embodiment, the actuating member 216 and the associated gear 214 may be configured to form a worm drive for rotationally driving the depth adjustment assembly 200. Specifically, the actuating member 216 may be configured as a worm including a screw thread 222 configured to engage corresponding gear teeth 220 defined around the outer perimeter 218 of the gear 214. In such an embodiment, the gear teeth 220 may, for example, be circumferentially spaced apart along the outer perimeter 218 of the depth adjustment gear 214 by a circumferential offset A1. Additionally, the screw thread 222 may be configured to wrap around a base shaft 224 of the actuating member 216 at a screw angle A2 corresponding to the circumferential offset A1 of the gear teeth 220 to allow the screw thread 222 to mesh with the gear teeth 220 for transferring torque from the actuating member 216 to the gear 214.

By configuring the depth adjustment gear 214 as a worm gear and the actuating member 216 as a worm, it can be ensured that the depth adjustment assembly 200 may only rotate when the actuating member 216 is rotated. In this regard, torque may not be transferred, or may not effectively be transferred, vice versa, i.e. from the gear 214 of the depth adjustment assembly 200 to the actuating member 216. As such, accidental rotation and, thus, accidental adjustment of the position of the depth adjustment assembly 200 is prevented. However, it should be appreciated that, in other embodiments, the depth adjustment gear 214 may be configured to allow the depth adjustment assembly 200 to be rotated relative to the actuating member 216, as necessary or desired.

In the embodiment shown in FIGS. 3 and 5, the actuating member 216 may be configured to be supported by a mounting bracket 226 rigidly coupled or otherwise fixed relative to the support structure 126. Specifically, the actuating member 216 may be rotatably supported by the mounting bracket 226 such that the screw thread 222 is maintained in engagement with the gear teeth 220 of the depth adjustment gear 214 as a torsional force is being applied to the actuating member 216, e.g., via a handle 228. In such an embodiment, the actuating member 216 may be configured to be manually rotated via the handle 228 so as to manually adjust the penetration depth setting 122 of the opener 120. For example, the handle 228 may be configured to be ergonomically formed and positioned, such that an operator may easily grasp and rotate the actuating member 216. Such a configuration may allow the depth adjustment assembly 200 of each seed planting unit 108 to be individually adjustable, i.e., adjusted independently of the other depth adjustment assembly(s) 200 of the agricultural implement 100, thereby increasing the control that an operator has on the placement of the openers 120 into the ground.

Alternatively, the handle 228 may, for example, be configured as, or be coupled to, an output shaft for a separate rotational drive source, such as a motor 230, so that each depth adjustment assembly 200 may be configured to be automatically adjustable via operation of the motor 230. In such an embodiment, the motors 230 associated with two or more of the depth adjustment assemblies 200 may be configured to be controlled individually or as a group via one or more controllers 232. The controller(s) 232 may include a communications interface 234 to provide a means for the controller 232 to communicate with any of the various other system components of the agricultural implement and/or any components of the work vehicle towing the implement. For instance, one or more communication links or interfaces 236 may be provided between the communications interface 234 and a user interface 238 to allow the controller 232 to receive input signals from the user interface 238. The user interface 238 may be configured to receive information from the operator such as, but not limited to, information regarding the desired penetration depth setting for the opener 120, and to send input signals to the communications interface 234 via the communication link(s) 236. Similarly, one or more communicative links or interfaces 240 may be provided between the communications interface 234 and the motor(s) 230 to allow the operation of the motor(s) 230 to be controlled by the controller(s) 232.

By providing each seed planting unit 108 in association with an individual, electronically controlled actuator or rotational drive source, such as the motor 230 described above with reference to FIG. 5, the penetration depth of the seed planting unit 108 may be adjusted automatically (i.e., without manual manipulation of the depth adjustment assembly 200). As such, the time required to adjust the penetration depth may be reduced significantly, thus increasing seeding efficiency. For example, in instances in which each seed planting unit 108 includes an associated motor 230 or other rotational drive source, the operator may provide an input (via the user interface 238) instructing the controller(s) 232 to control the operation of the various motors 230 (or other rotational drive sources) such that the penetration depth setting for each opener 120 of the implement is adjusted to a given operator-selected setting. Additionally, the depth adjustment assembly 200 may be locked into position relative to the support structure 126 by use of the rotary motor 230 alone, thus reducing material costs and the complexity of the seed planting unit 108.

Figure 6:
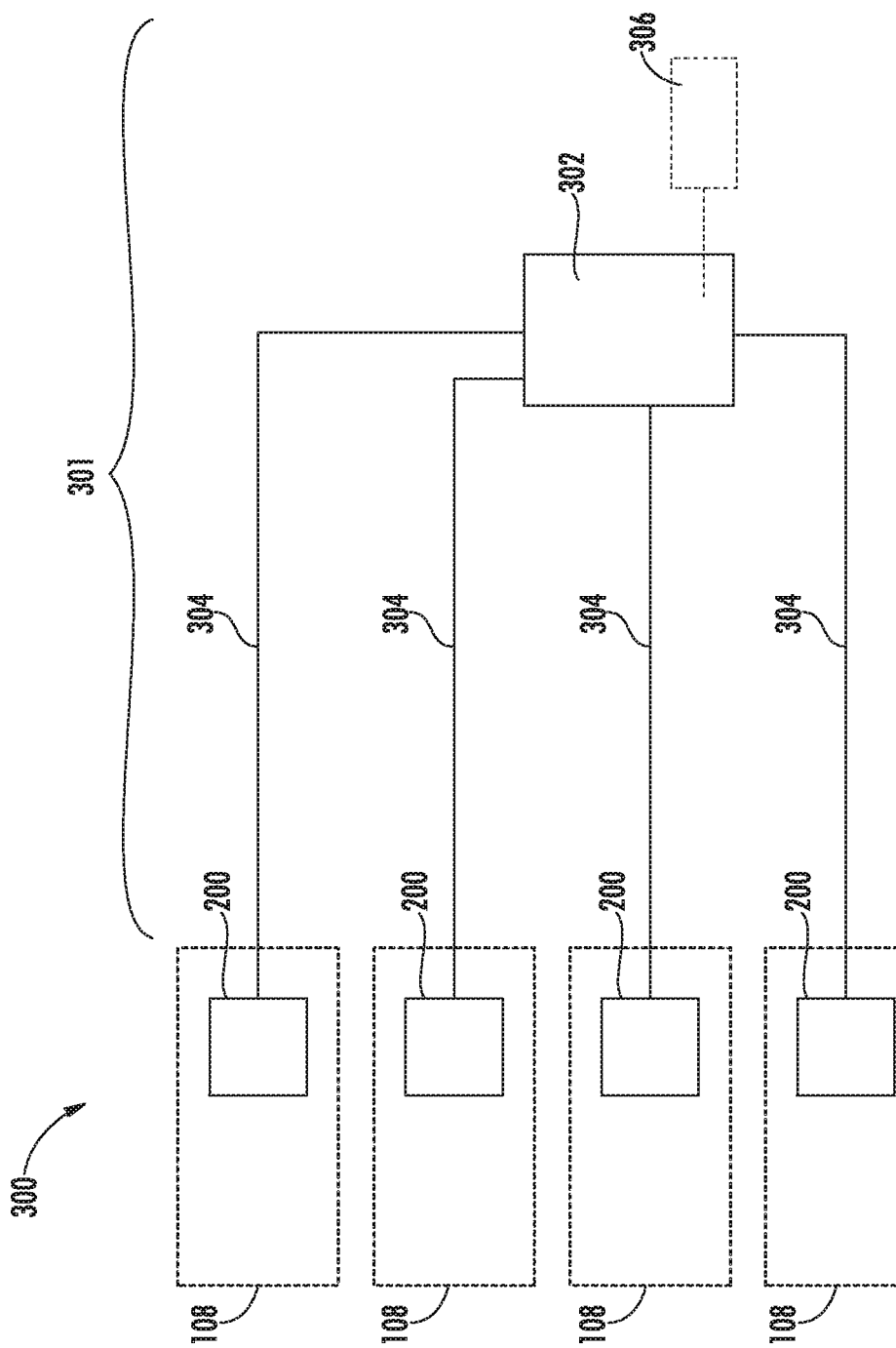
FIG. 6 illustrates a schematic view of one embodiment of a system for adjusting the penetration depth settings of plurality of seed planting units of an agricultural implement in accordance with aspects of the present subject matter, particularly illustrating the system including a common drive assembly for rotationally driving the depth adjustment assemblies of various seed planting units.

Referring now to FIG. 6, a schematic view of one embodiment of a system 300 for simultaneously adjusting the penetration depth settings for two or more seed planting units of an agricultural implement is illustrated in accordance with aspects of the present subject matter. In general, the system 300 will be described herein with reference to the agricultural implement 100 (including the seed planting units 108) and the depth adjustment assemblies 200 described above with reference to FIGS. 1-5. However, it should be appreciated that the disclosed system 300 may generally be utilized with any planter or seeder having any suitable implement configuration, with seed planting units having any suitable row unit configuration, and with depth adjustment assemblies having any suitable adjustment configuration. In general, the system 300 may include a common drive assembly 301 for rotationally driving the depth adjustment assemblies 200 of a plurality of different seed planting units 108. In several embodiments, the common drive assembly 301 may include a rotational drive unit 302 (alternately referred to herein as "common drive unit 302" or "drive unit 302") configured to be operatively coupled to the various depth adjustment assemblies 200 via a plurality of torque transmission members 304. Specifically, as shown in FIG. 6, the common rotational drive unit 302 may be coupled to each depth adjustment assembly 200 via a respective torque transmission member 304. As a result, torque deriving from the rotational drive unit 302 may be transmitted through each transmission member 304 to its respective depth adjustment assembly 200 for rotationally driving such assembly 200 (e.g., the cam member 204 and associated gear 216), thereby allowing the penetration depth setting of each associated seed planting unit 108 to be adjusted.

It should be appreciated that, although the common drive unit 302 is shown in FIG. 6 as being coupled to four separate depth adjustment assemblies via a like number of torque transmission members 304, the drive unit 302 may generally be configured to be coupled to any suitable number of depth adjustment assemblies 200 (e.g., via a corresponding number of transmission members 304 or via one or more shared torque transmission members 304). For instance, in one embodiment, the depth adjustment assembly 200 of each seed planting unit 108 of a given implement may be coupled to a single common drive unit 302. Alternatively, the various seed planting units 108 may be sub-divided into different groups, with each the depth adjustment assemblies 200 of each group of units 108 being coupled to a common drive unit 102. In such instance, the disclosed system 300 may include a common drive assembly 301 (e.g., a rotational drive unit 302 and associated torque transmission members 304) for each predetermined group of seed planting units 108.

It should also be appreciated that, in several embodiments, the operation of the rotational drive unit 302 may be configured to be automatically controlled via a suitable controller, such as controller 306 shown in FIG. 6. In such embodiments, the controller 306 may be configured to control the operation of the rotational drive unit 302 to automatically adjust the penetration depth settings of the associated seed planting units 108 based on, for example, inputs received from the operator and/or based on any other suitable inputs received at the controller 306 (e.g., sensor inputs).

Figure 7:
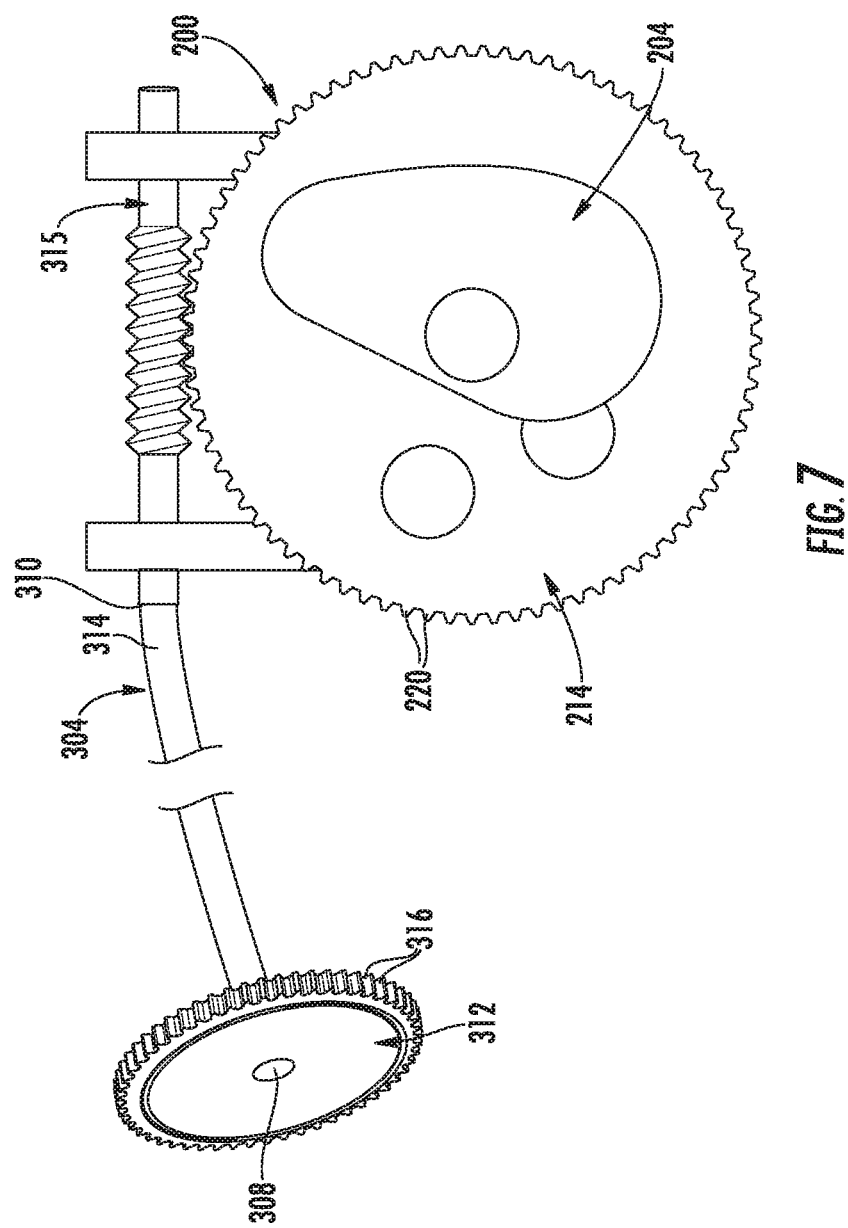
FIG. 7 illustrates a partial, perspective view of one embodiment of suitable components that may be included within the depth adjustment system shown in FIG. 6 for rotationally driving the depth adjustment assembly of a given seed planting unit in accordance with aspects of the present subject matter, particularly illustrating the system including a drive gear, a torque transmitting cable, and an output gear for rotationally driving the depth adjustment assembly.

Referring now to FIG. 7, one embodiment of a suitable torque transmission member 304 that may be utilized within the disclosed system 300 for transmitting torque for the common drive unit 302 to a given depth adjustment assembly 200 is illustrated in accordance with aspects of the present subject matter. As shown, the torque transmission member 304 may include a flexible shaft 314 (e.g., a torque cable) extending lengthwise between an input end 308 and an output end 310, with the input end 308 configured to be rotationally coupled to the common drive unit 302 of the system 300 and the output end 310 configured to be rotationally coupled to the associated depth adjustment assembly 200. In the illustrated embodiment, a drive or input gear 312 is provided at the input end 308 of the flexible shaft 314 for coupling the shaft 314 to the common drive unit 302. Example of suitable configurations for the common drive unit 302 will generally be described below with reference to FIGS. 8-10. Additionally, as shown in the illustrated embodiment, a driven or output gear 315 is provided at the output end 310 of the flexible shaft 314 for rotationally driving the depth adjustment assembly 200. Specifically, as shown in FIG. 7, the output gear 315 may be configured the same as or similar to the worm-type actuating member 216 described above (e.g., with reference to FIG. 5) to allow the output gear to mesh with the depth adjustment gear 214 of the depth adjustment assembly 200. Accordingly, by rotationally driving the input gear 312, torque may be transmitted through the flexible shaft 314 to the output gear 315, which may, in turn, rotationally drive the depth adjustment assembly 200 to adjust the penetration depth setting of the associated seed planting unit 108.

It should be appreciated that, by configuring the various transmission members 304 to include flexible shafts 314, torque may be generally remotely transmitted from the common drive unit 302 to each respective depth adjustment assembly 200 through tortuous paths. For example, two or more of the flexible shafts 314 may extend between the common drive unit 302 and the associated depth adjustment members 200 along paths incorporating one or more turns, bends, and/or loops. Thus, the flexible shafts 314 may allow an operator to actuate the various depth adjustment assemblies 200 from a single location on the agricultural implement 100, which may be remote to the locations of the associated seed planting units 108.

Figure 8:
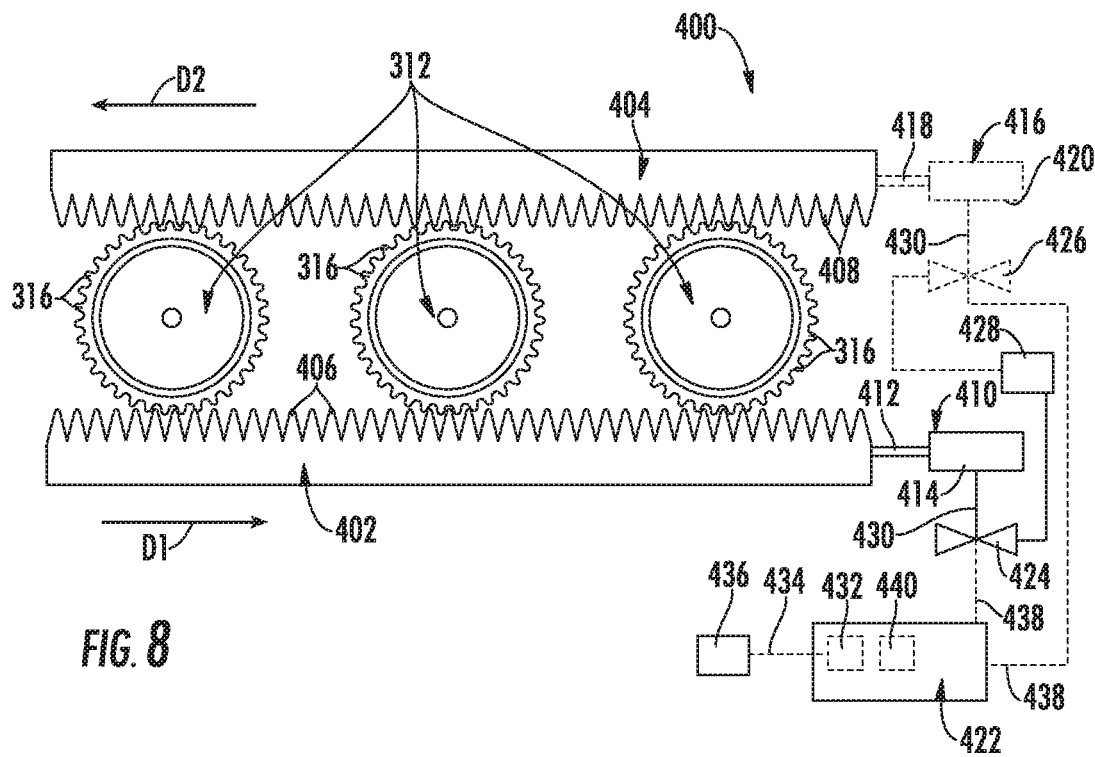
FIG. 8 illustrates one embodiment of suitable components that may be included within a common drive assembly of the disclosed depth adjustment system for rotationally driving the depth adjustment assemblies of multiple seed planting units of a given agricultural implement in accordance with aspects of the present subject matter, particularly illustrating the common drive assembly configured for use with the drive gear shown in FIG. 7.
Figure 9:
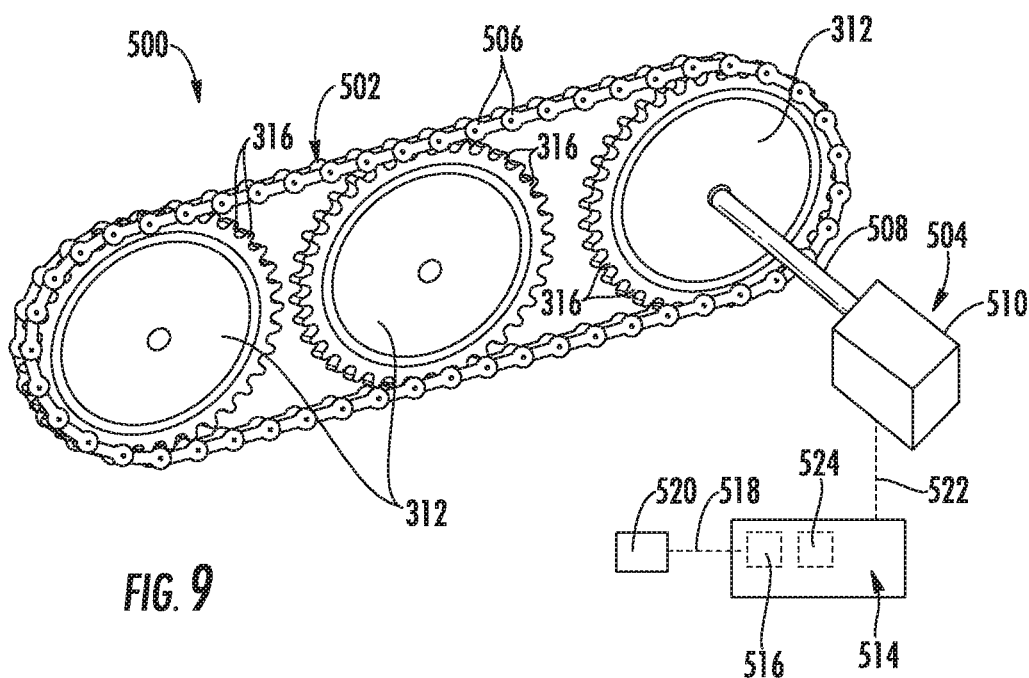
FIG. 9 illustrates another embodiment of suitable components that may be included within a common drive assembly of the disclosed depth adjustment system for rotationally driving the depth adjustment assemblies of multiple seed planting units of a given agricultural implement in accordance with aspects of the present subject matter, particularly illustrating the common drive assembly configured for use with the drive gear shown in FIG. 7.
Figure 10:
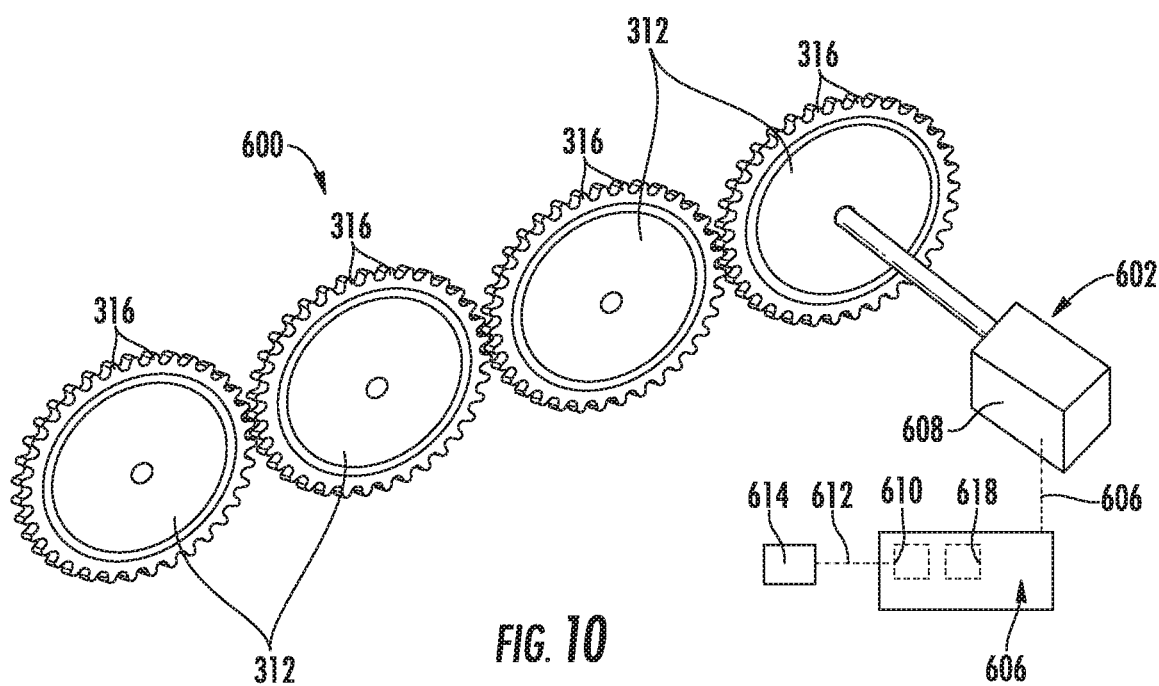
FIG. 10 illustrates a further embodiment of suitable components that may be included within a common drive assembly of the disclosed depth adjustment system for rotationally driving the depth adjustment assemblies of multiple seed planting units of a given agricultural implement in accordance with aspects of the present subject matter, particularly illustrating the common drive assembly configured for use with the drive gear shown in FIG. 7.

Referring now to FIGS. 8-10, examples of various embodiments of a common drive unit 302 suitable for use within the disclosed system 300 are illustrated in accordance with aspects of the present subject matter. As will be described below, the common drive unit 302 may, in several embodiments, be configured such that rotational torque is able to be simultaneously transmitted to two or more of the depth adjustment assemblies 200 of the seed planting units 108 through the associated torque transmission members 304.

For example, FIG. 8 illustrates one embodiment of a common drive unit 302 configured for rotationally driving two or more depth adjustment assemblies 200 in accordance with aspects of the present subject matter. As shown in FIG. 8, the common drive unit 302 may be configured as a rack-and-pinion assembly 400. In such an embodiment, the rack-and-pinion assembly 400 may be configured to rotationally drive the input gears 312 of two or more of the torque transmission members 304 to allow for torque to be transmitted therethrough to the respective depth adjustment assemblies 200.

In the illustrated embodiment, the rack-and-pinion assembly 400 comprises a first rack 402 and a second rack 404, with each of the first and second racks 402, 404, respectively including rack teeth 406, 408 configured to engage or otherwise mesh with corresponding gear teeth 316 of the input gears 312 (e.g., as pinions) of the associated torque transmission members 304. In addition, the rack-and-pinion assembly 400 may generally be configured such that the input gears 312 of the torque transmission members 304 may be rotatably driven by linear movement of one or both of the racks 402, 404 of the rack-and-pinion assembly 400. As such, by linearly actuating one of the racks relative to the other, torque may be transmitted through the transmission members 304 for rotationally driving the respective depth adjustment assemblies 200. In another embodiment, the rack-and-pinion assembly 400 may only include a single rack, such as one of the first or second racks 402, 404, to transmit torque to the transmission members 304.

For example, in the illustrated embodiment, the rack-and-pinion assembly 400 includes a first linear actuator 410 configured to actuate the first rack 402. The first linear actuator 410 includes a first actuating arm 414 configured to be movable relative to a first base cylinder 414, with the first actuating arm 414 being coupled to the first rack 402 such that the first rack 402 is movable in a first direction (e.g., in the direction of arrow D1) relative to the second rack 404 in order to rotationally drive the input gears 312. Alternatively or additionally, the rack-and-pinion assembly 400 may include a second linear actuator 416 having a second actuating arm 418 configured to be movable relative to a second base cylinder 420, with the second actuating arm 418 being coupled to the second rack 404 such that the second rack 404 is movable in a second direction (e.g., in the direction of arrow D2), generally opposite from the first direction, relative to the first rack 402, in order to rotationally drive the input gears 312.

In several embodiments, the operation of the rack-and-pinion assembly 400 may be configured to be electronically controlled by a controller 422 (e.g., which may be configured as the controller 306 shown in FIG. 6). More particularly, the first and/or second actuators 410, 416 may be electronically controlled via the controller 422, which may correspond to any suitable processor-based device(s) having a processor and a memory configured to store computer-readable instructions that can be executed by the processor. In such an embodiment, the controller 422 may be configured to control the operation of one or more components that regulate the actuation of the actuating arm(s) 414, 418 relative to the respective base cylinder(s) 414, 420. For example, the first controller 422 may be communicatively coupled to one or more control valve(s) 424, 426 configured to regulate the supply of fluid 428 (e.g., hydraulic fluid or air) to the actuator(s) 410, 416. In such instance, the control valve(s) 424 may be fluidly connected to the actuator(s) 410, 416 through a hydraulic line(s) 430.

Moreover, similar to that described above with reference to FIG. 5, the controller 422 may also include a communications interface 432 to provide a means for the controller 422 to communicate with any of the various other system components of the agricultural implement and/or any components of the work vehicle towing the implement. For instance, one or more communication links or interfaces 434 may be provided between the communications interface 432 and a user interface 436 to allow the controller 422 to receive input signals from the user interface 436. The user interface 436 may be configured to receive information from the operator such as, but not limited to, information regarding the desired penetration depth setting for the opener 120, and to send input signals to the communications interface 432 via the communication link(s) 434. Similarly, one or more communicative links or interfaces 438 may be provided between the communications interface 432 and the actuator(s) 410, 416 (and/or a related component configured to control the operation of the actuator(s) 410, 416, such as a related control valve(s) 424) to allow the operation of the actuator(s) 410, 416 to be controlled by the controller 422.

In one embodiment, the controller 422 may also include means to verify the position of one or both of the racks 402, 404. For example, a position sensor 440 may be in communication with the controller 422, with the position sensor 440 being configured to detect a position of, for example, one or both of the racks 402, 404 and/or one or both of the actuating arms 414, 418. The controller 422 may be programmed to compare the sensed position detected by the position sensor 440 to a predetermined position and control one or both of the actuating arms 414, 418 accordingly. In such a way, the penetration depth settings 122 of the associated openers 120 can be actively monitored and adjusted, and/or an operator notification can be generated based on the positions of the depth adjustment assemblies 200 to allow for more accurate control the depth settings for the openers 120.

Referring now to FIG. 9, a partial, perspective view of another embodiment of a common drive unit 302 rotationally driving two or more depth adjustment assemblies 200 is illustrated in accordance with aspects of the present subject matter. As shown in FIG. 9, the common drive unit 302 is configured as a chain drive assembly 500. In such an embodiment, the chain drive assembly 500 may be configured to rotationally drive the input gears 312 of two or more of the torque transmission members 304 to allow for torque to be transmitted therethrough to the respective depth adjustment assemblies 200.

In the illustrated embodiment, the chain drive assembly 500 includes a chain 502 and a rotary actuator 504. The chain 502 generally includes a plurality of chain links 506, with each of the chain links 506 being configured to engage the gear teeth 316 of the associated input gears 312 of the torque transmission members 304. As shown in FIG. 9, the input gears 312 may be engaged with the chain 502 such that movement of the chain 502 causes each of the engaged gears 312 to rotate with the same rotational speed. In the embodiment shown, a shaft 508 of the rotary actuator 504 may be rotatably fixed to one of the input gears 312. Thus, as the shaft 508 is rotatably driven by the motor 510, the input gear 312 fixed to the shaft 508 is correspondingly rotated in a manner that drives chain 502 in the same direction of rotation as the shaft 508, thereby rotationally driving the remaining input gears 312 coupled to the chain 502. Alternatively, the rotary actuator 504 may be configured to rotatably drive a separate drive gear (not shown) engaged with the chain 502 to drive the various input gears 312.

In several embodiments, the operation of the rotary actuator 504 may be electronically controlled via a controller 514 (e.g., which may be configured as the controller 306 shown in FIG. 6). The controller 514 may be configured the same as, or similar to, the controller 232 described above with reference to FIG. 5. For example, the controller 514 may be communicatively coupled to the motor 510 and include a communications interface 516, communication links 518, a user interface 520 and communicative links 522 configured the same as or similar to the communications interface 234, communication links 236, user interface 238 and communicative links 240 described above with reference to FIG. 5. Additionally, the controller 514 may also include means to verify the position of the associated depth adjustment assemblies 200. For example, a rotational position sensor 524 may be in communication with the controller 514, with the position sensor 524 being configured to detect a rotational position of, for example, one the input gears 312 and/or one of the depth adjustment assemblies 200. The controller 514 may be programmed to compare the sensed position detected by the position sensor 524 to a predetermined position and control the rotary actuator 504 accordingly. In such a way, the penetration depth setting 122 of the associated openers 120 can be actively monitored and adjusted, and/or an operator notification can be generated based on the positions of the depth adjustment assemblies 200 to allow for more accurate control the depth settings for the openers 120.

Referring now to FIG. 10, a partial, perspective view of another embodiment of a common drive unit 302 for rotationally driving two or more depth adjustment assemblies 200 is illustrated in accordance with aspects of the present subject matter. As shown in FIG. 9, the common drive unit 302 is configured as a meshed gear assembly 600, with two or more of the input gears 312 of the torque transmission members 304 configured to be meshed with one another. In such an embodiment, one of the input gears 312 may be configured to be rotationally driven by a rotary actuator 602 when it is desired to adjust the penetration depth settings 122 of the various openers 120. Alternatively, the rotary actuator 602 may be configured to rotationally drive a separate drive gear 604 (not shown), with the separate drive gear 604 configured to rotationally mesh with the input gears 312. In one embodiment, the rotary actuator 602 may be configured the same as the rotary actuator 504 described above with reference to FIG. 9, such that rotation of one of the input gears 312 or the separate drive gear 604 via the rotary actuator 602 causes rotation of all of the meshed input gears 312. In the embodiment shown in FIG. 10, the input gears 312 are directly meshed with one another, such that input gears 312 directly adjacent to one another are rotatable in opposite directions. However, in another embodiment, the input gears 312 may instead be directly meshed with intermediate gears (not shown), such that all of the input gears 312 are rotatable in the same direction.

In several embodiments, the operation of the rotary actuator 602 may be electronically controlled via a controller 606 (e.g., which may be configured as the controller 306 shown in FIG. 6). The controller 606 may be configured the same as, or similar to, the controller 514 described above with reference to FIG. 9. For example, the controller 606 may be communicatively coupled to a motor 608 of the rotary actuator 602 and include a communications interface 610, communication links 612, a user interface 614 and communicative links 616 configured the same as or similar to the communications interface 516, communication links 518, user interface 520 and communicative links 522 described above with reference to FIG. 9. Additionally, the controller 606 may also include means to verify the position of the associated depth adjustment assemblies 200. For example, a rotational position sensor 618 may be in communication with the controller 606, with the position sensor 618 being configured to detect a rotational position of, for example, one the input gears 312 and/or one of the depth adjustment assemblies 200. The controller 606 may be programmed to compare the sensed position detected by the position sensor 618 to a predetermined position and control the rotary actuator 602 accordingly. In such a way, the penetration depth setting 122 of the associated openers 120 can be actively monitored and adjusted, and/or an operator notification can be generated based on the positions of the depth adjustment assemblies 200 to allow for more accurate control the depth settings for the openers 120.

The embodiments of the common drive unit 302 described above with reference to FIGS. 8-10 should not be construed as limiting. Instead, the common drive unit 302 may be configured in any other manner such that torque is transferred from the common drive unit 302 to two or more of the depth adjustment assemblies 200 via the associated torque transmission members 304. For example, the common drive unit 302 may include a push-pull bar directly connected to the torque transmission members 304 via links, such that linear actuation of the push-pull bar causes torque to be transmitted through the members 304 to the depth adjustment assemblies 200. Alternatively, for example, the common drive unit 302 may be configured a worm engaged with two or more of the input gears 312, with the worm being configured to be rotated by a rotary drive to adjust the position of the associated depth adjustment assemblies 200.

By configuring the disclosed system 300 to have a common drive assembly 301 as described above, the penetration depth of the seed planting units 108 may be adjusted automatically and simultaneously (i.e., without manual manipulation of the depth adjustment assemblies 200). As such, the time required to adjust the penetration depths of the various seed planting units 108 may be reduced significantly, thus increasing seeding efficiency. For example, in instances in which each seed planting unit 108 is engaged with a common drive unit 302, the operator may provide an input (via the user interface) instructing the controller to control the operation of the common drive unit 302 such that the penetration depth settings for the various openers 120 of the implement are adjusted to a given operator-selected setting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting penetration depth settings of seed planting units of an agricultural implement, the system comprising:
    a plurality of seed planting units, each of the seed planting units having a depth adjustment assembly; and
    a common drive assembly configured to drive the depth adjustment assemblies of the plurality of seed planting units to simultaneously adjust a penetration depth setting of each respective seed planting unit;
    wherein each depth adjustment assembly includes a cam member having a cam surface defining a cam profile, wherein the cam member is configured to be rotated to adjust the penetration depth setting of each respective seed planting unit;
    wherein each depth adjustment assembly includes a depth adjustment gear configured to be rotationally driven by the common drive assembly, the depth adjustment gear being rotationally fixed to the cam member such that the cam member is rotated when the depth adjustment gear is rotated by the common drive assembly; and
    wherein each depth adjustment gear is rotationally driven by a respective worm gear of the common drive assembly.

2. The system of claim 1, wherein the common drive assembly includes a common drive unit configured to be operatively coupled to the depth adjustment assemblies, the common drive unit configured to rotationally drive the depth adjustment assemblies to adjust the penetration depth settings.

3. The system of claim 2, wherein the common drive unit forms part of a rack-and-pinion assembly having at least one rack, wherein linear actuation of the at least one rack rotationally drives each depth adjustment assembly via respective torque transmitting members coupled between the depth adjustment assemblies and the common drive unit.

4. The system of claim 2, wherein the common drive unit is configured as a chain drive assembly having a chain including a plurality of chain links, wherein driving of the chain rotationally drives each depth adjustment assembly via respective torque transmitting members coupled between the depth adjustment assemblies and the common drive unit.

5. The system of claim 2, wherein the common drive unit is configured as a meshed gear assembly, wherein the meshed gear assembly rotationally drives each depth adjustment assembly via respective torque transmitting members coupled between the depth adjustment assemblies and the common drive unit.

6. The system of claim 2, wherein the common drive assembly includes a plurality of torque transmitting members, each torque transmitting member coupling the common drive unit to a respective depth adjustment assembly of the plurality of the depth adjustment assemblies such that rotational torque is transmitted from the common drive unit through the torque transmitting members to each respective depth adjustment assembly.

7. The system of claim 6, wherein each torque transmitting member comprises a flexible shaft, each flexible shaft being rotationally coupled between the common drive unit and the respective depth adjustment assembly of the plurality of the depth adjustment assemblies.

8. The system of claim 7, wherein each torque transmitting member further includes an input gear coupled to an input end of the flexible shaft, the input gear being rotationally driven by the common drive unit.

9. The system of claim 7, wherein each torque transmitting member further includes an output gear coupled to an output end of the flexible shaft, the output gear being rotationally coupled to the respective depth adjustment assembly of the plurality of the depth adjustment assemblies.

10. The system of claim 2, further comprising a controller to receive a desired penetration depth setting for the plurality of seed planting units, the controller being further configured to control the operation of the common drive assembly to adjust a penetration depth setting of each respective seed planting unit to the desired penetration depth setting.

* * * * *